No. 642,286. Patented Jan. 30, 1900.
H. R. BERGER.
ACETYLENE GENERATOR.
(Application filed Aug. 18, 1898.)

(No Model.)

Witnesses:
M. G. McLean
L. J. McGhie

Inventor
Hans Richard Berger,
By Clark Deemer & Co.
Attorneys.

UNITED STATES PATENT OFFICE.

HANS RICHARD BERGER, OF BERLIN, GERMANY.

ACETYLENE-GENERATOR.

SPECIFICATION forming part of Letters Patent No. 642,286, dated January 30, 1900.

Application filed August 18, 1898. Serial No. 688,867. (No model.)

*To all whom it may concern:*

Be it known that I, HANS RICHARD BERGER, a subject of the Emperor of Germany, and a resident of the city of Berlin, Kingdom of Prussia, German Empire, have invented certain new and useful Improvements in Apparatus for Generating Pure Acetylene; and I hereby declare that the following is a full, clear, and exact specification of the same.

The present invention relates to acetylene-gas generators; and it consists of the peculiar arrangement of the carbid-holders in the generating-chamber, as hereinafter particularly set forth.

In order to render the present specification easily intelligible, reference is had to the accompanying drawings, in which similar letters and numerals of reference denote similar parts throughout both views.

Figure 1:
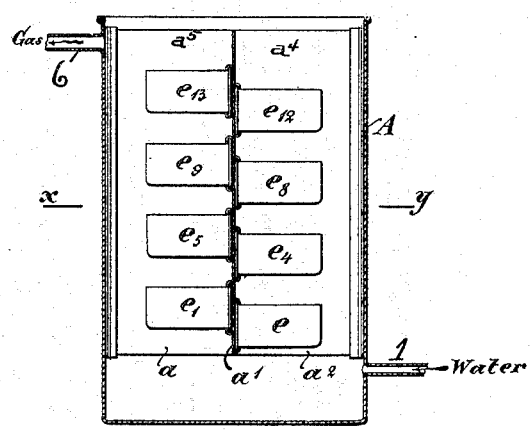
Figure 2:
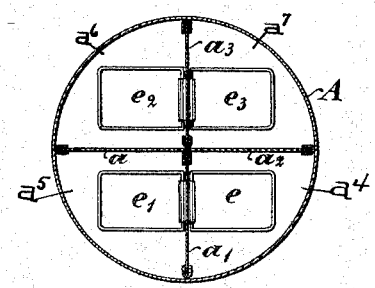

Figure 1 is a vertical section through the generator, and Fig. 2 a horizontal section on the line $x$ $y$ of Fig. 1.

The generator A is provided with partition-walls $a$ $a'$ $a^2$ $a^3$, which extend nearly to the bottom of the same and divide the said generator into four chambers $a^4$ $a^5$ $a^6$ $a^7$ in the vertical plane. To these walls are attached in each of the chambers a series of superposed carbid-holders $e$ $e'$ $e^2$ $e^3$ $e^4$ to $e^{13}$, the said holders being staggered—*i. e.*, the holder $e'$ is mounted on its respective wall slightly higher than the holder $e$ of the preceding chamber and $e^2$ slightly higher than $e'$, and so on throughout the apparatus.

The gas generated passes to a gasometer through the outlet-pipe 6, and the water is intermittently fed to the said generator through the pipe 1, being introduced at the bottom of the same. The quantity of water admitted each time is sufficient to develop one holder only and is advantageously about five times as much in quantity as the contents of one of the holders.

The partition-walls $a$ $a'$ $a^2$ $a^3$ in the present case are of great importance, since they prevent the water from splashing from one chamber or holder to the next above it, and thus developing a part of the contents of the latter.

The carbid-holders might also be mounted on the interior wall of the generator instead of on the partition-walls.

I claim as my invention—

1. An acetylene-gas generator having vertically-disposed partition-walls to divide it into a series of chambers said chambers being in open communication with each other below the lower edge of said partition-walls, and a series of carbid-holders mounted between said vertical walls said holders being staggered, the set of holders in one chamber being slightly higher, as regards its separate members than those of the preceding chamber in the manner and for the purpose substantially as described.

2. The combination of an acetylene-generator A having vertically-disposed partition-walls $a$ $a'$ $a^2$ $a^3$ therein extending almost to the bottom of the same and a series of carbid-holders $e$ $e'$ $e^2$ $e^3$ to $e^{13}$ mounted on the said partition-walls, each member of the set of one chamber being mounted at a slightly-higher level than the corresponding member of the preceding set in the manner and for the purpose substantially as described.

In witness whereof I have hereunto set my hand in presence of two witnesses.

HANS RICHARD BERGER.

Witnesses:
 C. H. DAY,
 HENRY HASPER.